United States Patent
Rapp et al.

(10) Patent No.: US 11,201,676 B2
(45) Date of Patent: Dec. 14, 2021

(54) CODIRECTIONAL ROPA SUPPLIED WITH POWER VIA A SEPARATE FIBER TRANSMITTING DATA IN OPPOSITE DIRECTION

(71) Applicant: Xieon Networks S.a.r.l., Senningerberg (LU)

(72) Inventors: Lutz Rapp, Deisenhofen (DE); Nelson Costa, Tomar (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 551 days.

(21) Appl. No.: 16/087,870

(22) PCT Filed: Apr. 13, 2017

(86) PCT No.: PCT/EP2017/058968
§ 371 (c)(1),
(2) Date: Sep. 24, 2018

(87) PCT Pub. No.: WO2017/178603
PCT Pub. Date: Oct. 19, 2017

(65) Prior Publication Data
US 2020/0304208 A1  Sep. 24, 2020

(30) Foreign Application Priority Data

Apr. 15, 2016 (EP) .................................... 16165658

(51) Int. Cl.
*H04B 10/291* (2013.01)
*H01S 3/067* (2006.01)
(Continued)

(52) U.S. Cl.
CPC ....... *H04B 10/298* (2020.05); *H01S 3/06754* (2013.01); *H01S 3/094061* (2013.01);
(Continued)

(58) Field of Classification Search
None
See application file for complete search history.

(56) References Cited

U.S. PATENT DOCUMENTS

| | | | |
|---|---|---|---|
| 2006/0209394 A1* | 9/2006 | Papernyi | H04B 10/2916 359/341.33 |
| 2008/0152352 A1* | 6/2008 | Papernyi | H04B 10/298 398/157 |

(Continued)

OTHER PUBLICATIONS

Bosco, G. et al., On the Performance of Nyquist-WDM Terabit Superchannels Based on PM-BPSK, PM-QPSK, PM-8QAM or PM-16QAM Subcarriers, Journal of Lightwave Technology, vol. 29(1): 53-61 (2011).

(Continued)

*Primary Examiner* — Eric L Bolda

(57) ABSTRACT

The invention discloses a method of amplifying an optical signal, in particular a data signal, transmitted from a first location (A) to a second location (B) via a first transmission link (10a), wherein said optical signal is amplified by means of a transmitter side remote optically pumped amplifiers (ROPA) (18) comprising a gain medium (24), wherein the gain medium (24) of said transmitter side ROPA (18) is pumped by means of transmitter side pump power (20) provided from said first location (A), characterized in that at least a part of said transmitter side pump power (20) is provided by means of light supplied from said first location (A) to said transmitter side ROPA (18) via a portion of a second transmission link (10b) provided for transmitting optical signals from said second location (B) to said first location (A).

18 Claims, 10 Drawing Sheets

(51) Int. Cl.
   *H01S 3/094* (2006.01)
   *H01S 3/16* (2006.01)
   *H01S 3/23* (2006.01)
(52) U.S. Cl.
   CPC ...... *H01S 3/094096* (2013.01); *H01S 3/1608* (2013.01); *H01S 3/2383* (2013.01)

(56) References Cited

U.S. PATENT DOCUMENTS

| | | | |
|---|---|---|---|
| 2010/0054660 A1* | 3/2010 | Chang | H04B 10/2916 385/24 |
| 2010/0209117 A1* | 8/2010 | Chang | H01S 3/06758 398/175 |
| 2019/0148902 A1* | 5/2019 | Pelouch | H04B 10/2916 359/334 |

OTHER PUBLICATIONS

Gaudette, J. et al., "40 GB/s and 100 GB/s Ultra Long Haul Submarine Systems," SubOptic Conference and Convention, 5 pages (2010).

International Search Report and Written Opinion, PCT/EP2017/058968, dated Oct. 12, 2017, 18 pages.

Kaminow, I. et al., "Raman Amplification in Lightwave Communications Systems," Optical Fiber Telecommunications IV A Components, Chapter 5: 213-224 (2002).

Pavlovic, N. et al., "Efficiency of Ropa Amplification for Different Modulation Formats in Unrepeated Submarine Systems," SubOptic, 6 pages (2013).

Xia, T.J. et al., "557-km unrepeatered 100G transmission with commercial Raman DWDM System, enhanced ROPA, and cabled Large Aeff ultra-low loss fiber in OSP environment," Proc. OFC, 2014.

* cited by examiner

CODIRECTIONAL ROPA SUPPLIED WITH POWER VIA A SEPARATE FIBER TRANSMITTING DATA IN OPPOSITE DIRECTION

RELATED APPLICATIONS

This application is a 35 U.S.C. 371 national stage filing of International Application No. PCT/EP2017/058968, filed on Apr. 13, 2017, which claims priority to European Patent Application No. 16165658.2, filed on Apr. 15, 2016. The entire contents of these applications are incorporated herein by reference in their entirety.

FIELD OF THE INVENTION

The present invention is in the field of optical data communication. In particular, the present invention is related to the use of remote optically pumped amplifiers (ROPA) in optical transmission links.

BACKGROUND OF THE INVENTION

Unrepeatered transmission systems are attractive solutions for communication via optical fibers when the access to intermediate points is difficult or almost impossible. Typical applications are submarine links connecting islands with the mainland or with each other, but there are also use cases in terrestrial networks such as in desert, mountain, and forest areas. Elaborated amplifier setups installed at transmitter (TX) and receiver (RX) sides allow data transmission without intermediate amplification or regeneration. Additional advantages such as reduced cost of the cable and smaller weight due to the elimination of electrical power supply via the cable overweigh the increased cost associated with using more elaborated amplification schemes.

In addition to the use of rare earth doped fiber amplifiers, such as erbium doped fiber amplifiers (EDFA), optical signals can also be amplified by Raman amplification. Raman amplification is based on the stimulated Raman scattering (SRS) phenomenon, according to which a lower frequency "signal" photon induces the inelastic scattering of a higher-frequency "pump" photon in an optical medium in the nonlinear regime. As a result of this inelastic scattering, another "signal" photon is produced, while the surplus energy is resonantly passed to the vibrational states of the medium. This process hence allows for an all-optical amplification. In the so-called codirectional Raman amplification, the signal to be amplified and the pump light propagate in the same direction, while in counterdirectional Raman amplification, the propagation directions of the signal and the pump light are opposite.

Combining high output power boosters with counterdirectional Raman amplification has been sufficient for transmitting 2.5 Gbit/s and 10 Gbit/s signals in most of the currently deployed and commercially used wavelength division multiplexed (WDM) networks. In special cases bridging longer distances, the optical signal-to-noise ratio (OSNR) has been increased by embedding remote optically pumped amplifiers (ROPAs) in the cable around 100 km apart from the receiver, as is for example described in N. Pavlović, and L. Rapp, "*Efficiency of ROPA amplification for different modulation formats in unrepeatered submarine systems*", Proc. SubOptic 2013, Paris, France. Transponder characteristics and Raman gain coefficients are discussed in I. Kaminow, and T. Li, "*Optical fiber telecommunications IV A-Components*", Elsevier 2002; G. Bosco, V. Curri, A. Carena, P. Poggiolini, and F. Forghieri, "*On the performance of Nyquist-WDM terabit superchannels based on PM-BPSK, PM-QPSK, PM-8QAM or PM-16QAM subcarriers,*" IEEE J. Lightly. Tech., vol. 29, no. 1, pp. 53-61, January 2011; and R. Freund "*Multi-level modulation for high capacity WDM-systems,*" in Proc. ECOC 2012, Amsterdam, Netherlands.

With the trend to higher data rates such as 40 Gbit/s and 100 Gbit/s, codirectional Raman amplifiers and higher order Raman pumping schemes have been introduced in existing links in order to cope with the need for increased OSNR. However, a new generation of transponders with data rates of 200 Gbit/s, 400 Gbit/s, and beyond is already in the wings. The deployment of this new generation of transponders will be difficult using only the currently deployed amplification technologies. For the new generation of transponders, solutions providing a further improvement of the OSNR need to be developed.

The introduction of advanced modulation formats requires improving the noise performance of unrepeatered links. Placing an additional ROPA close to the transmitter side is a promising solution, but known solutions come with some major drawbacks. Supplying the pump power codirectionally to the signals is a straight-forward technique, but leads to signal distortions due to nonlinear fiber effects. Furthermore, significant performance improvement is achieved at small channel counts, only. Alternatively, additional fibers can be used for supplying the pump power to the ROPA cassette. However, this solution increases cost of the cable significantly. Therefore, a solution is needed that avoids the above mentioned disadvantages.

Of course, this technology can also be used to improve the margin of already installed links using currently available transponders with data rates up to 100 Gbit/s or to bridge distances that can currently not supported without intermediate amplification.

Various amplification technologies can be deployed simultaneously to extend the reach of unrepeatered transmission systems. The selection of the amplification technologies to deploy depends mainly on the distance that has to be bridged and the modulation format that is selected. Furthermore, some technologies are suitable for green field installations only. Typical combinations of amplification technologies in commercially deployed transmission systems are listed in Table 1.

TABLE 1

| | Amplification technology at TX side | Amplification technology at RX side |
|---|---|---|
| (7) | Codirectional Raman amp | ROPA close to RX (higher order) |
| (6) | Codirectional Raman amp | ROPA close to RX |
| (5) | High power booster (EDFA) | ROPA close to RX (higher order) |
| (4) | High power booster (EDFA) | ROPA close to RX |
| (3) | Codirectional Raman amp | Counterdirectional Raman amp |
| (2) | High power booster (EDFA) | Counterdirectional Raman amp |
| (1) | High power booster (EDFA) | Preamplifier (EDFA) |

In the basic configuration, the channel power is adjusted by means of a high output power booster to a power level providing optimum balance between OSNR and nonlinear fiber effects. Using lower power levels leads to reduced OSNR while increasing the power level above the optimum one also leads to performance degradation since the increase of the nonlinear penalty overwhelms the benefit from improved OSNR.

Distributed Raman amplification is currently a favorite technology to improve performance of installed links since no component in addition to the fiber needs to be integrated into the cable. Thanks to stimulated Raman scattering, optical power is transferred from shorter wavelengths to longer wavelengths. The maximum power transfer efficiency is achieved when the pump and data signals are spaced apart by about 100 nm, Therefore, the pump signals are usually transmitted in the 14xx nm window (1st order pumping), namely at around 1420 nm and 1450 nm.

In a first attempt to improve the performance of already installed links, typically counterdirectional Raman amplification is employed by launching one or more pump signals into the fiber from the receiver side. In this way, efficient amplification of the data signals is achieved.

Replacing the high power booster by a codirectional Raman amplifier gives some further reach extension. In this case, the pump signals are launched into the optical fiber from the transmitter side. However, the performance improvement achieved with this approach is smaller than the one achieved by counterdirectional Raman amplification. In order to maximize the benefit of this amplification scheme, the booster output power needs to be reduced as compared with the basic configuration.

Both amplification technologies can benefit from higher order pumping schemes transferring the pump power via some intermediate lightwaves to the data signals. In commercial systems, schemes up to the third order with lightwaves located in the 12xx nm range, around 1360 nm and 1450 nm have been used. The use of the higher order pumping in a codirectional configuration has the advantage of further reducing the impact of fiber nonlinearities at equal OSNR as compared with a first order pumping configuration. However, this technology might enhance the impact of imperfections of the pump on signal quality.

Remote optically pumped amplifiers (ROPAs) comprising a piece of erbium doped fiber (EDF) embedded into the link have been used in the art in challenging links that cannot be bridged with the techniques described so far. Energy for amplification is provided by a pump signal that is launched into the transmission fiber at the receiver side and propagates counterdirectionally to the signal. This pump signal will also interact with the data signals along the transmission fiber before reaching the EDF coil as in the case of counterdirectional Raman amplification. However, the power transfer from the pump to the data signals along the transmission fiber will not be as efficient as in the case of the counterdirectional Raman amplification configuration since the pump signal used with the ROPA is usually at around 1480 nm, instead of being in the 1420 nm-1460 nm range. The 1480 nm wavelength is chosen because it leads to a good power conversion efficiency in the EDF coil and experiences lower attenuation in the transmission fiber. However, if the pump signal is at 1465 nm or 1495 nm, the conversion efficiency is only slightly reduced. The optimum position of the EDF coil is usually around 100 km away from the receiver side for typical transmission fibers when using first order pumping. Additional performance improvement can be achieved by higher order Raman pumping schemes. However, the EDF coil needs to be pushed further away from the receiver in this case, as is explained in the article by N. Pavlović and L. Rapp cited above.

Techniques described so far have been used widely in commercial installations. In contrast, remote amplification close to the transmitter has mainly been used in some laboratory experiments conceived to demonstrate maximum transmission distance for a specific channel count. A reason for this is the increased complexity of the design of transmission systems using such TX ROPAs due to the higher power levels of the data channels close to the transmitter side. Furthermore, codirectional ROPAs are less efficient than their counterdirectional counterparts. Nevertheless, the use of this amplification configuration may be the key enabler for deploying the upcoming modulation formats (200 Gbit/s, 400 Gbit/s and beyond).

Cost for installing the different amplification technologies increases with the chronological order of their presentation in the preceding section. For a given link, complexity and cost of the required amplifiers typically increases with data rate.

FIG. 1 shows the reach improvement for 10 Gbit/s intensity-modulated signals with direct-detection (IM-DD) as well as polarization-multiplexed signals with coherent-detection and quadrature phase-shift keying (CP-QPSK). Typical combinations of amplification technologies, with increasing complexity from the bottom to the top, have been analyzed for the transmission of 32 channels in a pure silica core fiber (PSCF), characterized by an attenuation parameter of 0.177 dB/km at 1550 nm. The reach improvement is indicated relative to a basic configuration transmitting 10 Gbit/s signals and using erbium-doped fiber amplifiers (EDFAs) at the terminal sites only. The results have been obtained by means of simulations, whereas some data points have been verified experimentally. The optical power levels are optimized for each case.

Using 10 Gbit/s IM-DD signals, the maximum link attenuation can be increased by around 14 dB simply by using a combination of codirectional and counterdirectional Raman amplification. Additional 10 dB can be gained by embedding an EDF coil in the link. For an improvement up to 6 dB, even no distributed codirectional Raman amplification is required and a first order counterdirectional Raman amplifier is sufficient. In contrast, a combination of codirectional Raman amplification and third order counterdirectional Raman amplification is needed to transmit 40 Gbit/s CP-QPSK signals over the same link.

Sensitivity defined here as the minimum optical power or the minimum OSNR needed by a receiver to operate reliably with a BER below a target value is a key parameter for characterizing the performance of a receiver. Although the sensitivity of 100 Gbit/s CP-QPSK signals is 2 dB higher as compared with 40 Gbit/s signals in back-to-back (B2B) configurations (cf. article of G Bosco et al. cited above), the maximum reach is very similar for both modulation formats. This has been achieved by employing better components and algorithms, such as soft decision forward error correction (SD-FEC), so that the resilience to transmission effects could be increased. In summary, significantly more complex amplification technologies have to be employed when transmitting CP-QPSK signals over links instead of 10 Gbit/s IM-DD signals.

Taking into account that the required OSNR in a B2B configuration for 200 Gbit/s and 400 Gbit/s signals is much higher than for 100 Gbit/s signals and that there are currently not ground breaking technologies in the loop that could compensate for the increased ONSR requirements, the inventors expect that additional amplification technologies will have to be deployed to achieve the same reach.

FIG. 2 shows an unrepeatered transmission link 10 extending between a first location A and a second location B. The transmission link 10 could for example extend over 400 km or even more. Optical data signals 12 are sent from the first location A (also referred as the "transmitter location") to the second location B, which is also referred to as the "receiver location" herein. A ROPA 14 is provided in the link 10 which is closer to the second location B than to the first location A and is therefore referred to as "receiver side ROPA" herein. Note that while the "receiver side ROPA" is closer to the second location B then to the first location A, it may still be an appreciable distance away from the second location B, such as several tens or even 100 kilometers. The receiver side ROPA 14 is usually provided in a so-called ROPA cassette and comprises an erbium doped fiber (EDF) 24 and an isolator 26 and is pumped with a receiver side pump signal 16 provided from the receiver side (location B), which in the example shown has a wavelength of 1480 nm. Accordingly, the receiver side ROPA of 14 is arranged in a way discussed with reference to examples 4 to 7 of table 1 and FIG. 1. The receiver side ROPA 14 further comprises WDM couplers 28 allowing for branching off the receiver side pump signal 16 from the transmission link 10 before reaching the EDF coil and for feeding it into the EDF coil 24 such as to pass the EDF coil 24 in the same direction as the signal 12.

Further shown in FIG. 2 is a transmitter side ROPA 18, which is located closer to the location A than to the location B. The transmitter side ROPA 18 is pumped with a transmitter side pump signal 20, which is provided from the transmitter side (location A), and which in the example shown likewise has a wavelength of 1480 nm. The transmitter side ROPA 18 likewise comprises an EDF coil 24 and an isolator 26.

Simulation results as well as experimental data suggest that ROPA amplification by means of the transmitter side ROPA 18 close to the transmitter can provide noticeable performance improvement at small channel counts, but unfortunately, there is almost no performance improvement at larger channel counts when providing the pump power via the fiber used for signal transmission. It has furthermore been found that signals may be distorted by strong copropagating pump signals due to nonlinear fiber effects.

Both of these drawbacks could in principle be avoided when supplying the pump power to the transmitter side ROPA 18 via a separate fiber 22, as shown in FIG. 3. However, using such a dedicated fiber 22 for pump power supply increases the cost of optical link significantly. Thus, operators would be typically reluctant to use this technique.

Forward and backward ROPA amplification making reuse of residual pump power has been demonstrated in T. J. Xia, "*557-km unrepeatered 100G transmission with commercial Raman DWDM system, enhanced ROPA, and cabled Large Aeff ultra-low loss fiber in OSP environment*", in Proc. OFC 2014, San Francisco, USA. However, this set up comes with two major drawbacks:

(1) Forward and backward ROPA cassettes are placed at the same location. In the experiment, the ROPA cassettes are placed 133.7 km from the terminals. This position is not optimum for the forward ROPA.
(2) In the configuration, high pump powers are transmitted codirectionally to the signals. The Raman gain induced by the high pump powers as well as additional distortions induced by the pump via nonlinear fiber effects affect system performance.

SUMMARY OF THE INVENTION

A problem underlying the invention is to provide a method and apparatus for amplifying an optical signal by remote optically pumping that allows for improving the noise performance of unrepeatered links. This problem is solved by a method according to claim 1, a bidirectional optical link according to claim 12, a ROPA according to claim 23 as well as an alternative ROPA according to claim 25. Preferred embodiments are defined in the dependent claims.

According to one embodiment, a method of amplifying an optical signal, in particular an optical data signal, transmitted from a first location A to a second location B via a first transmission link is provided, wherein said optical signal is amplified by means of a transmitter side remote optically pumped amplifier (ROPA) comprising a gain medium, wherein the gain medium of said transmitter side ROPA is pumped by means of transmitter side pump power provided from said first location A. At least a part of said transmitter side pump power is provided by means of light supplied from said first location A to said transmitter side ROPA via a portion of a second transmission link provided for transmitting optical signals from said second location B to said first location A.

Herein, said at least part of said transmitter side pump power is transferred from said second transmission link to said first transmission link by means of a connection comprising a connection link which is connected at one end with the first transmission link and at the other and with the second transmission link. This way, the transmitter side pump power to be provided to the transmitter side ROPA in the first transmission link can be conveniently tapped from the second transmission link.

The connection link which may also be referred to as a "bypass link" is connected to said first and second transmission links by means of couplers, in particular WDM couplers. A splitter is provided in said connection link, said splitter allowing for splitting part of the light passing said connection link from said second transmission link to said first transmission link and feeding it back into the second transmission link. This split-off light is then used for pumping a receiver side ROPA provided in the second transmission link.

More precisely, the method of the invention further comprises a step of amplifying an optical signal, in particular an optical data signal transmitted from the second location B to the first location A via said second transmission link, wherein said step of amplifying said optical signal comprises amplifying said optical signal by means of a receiver side ROPA provided in said second transmission link. The receiver side ROPA comprises a gain medium, wherein the gain medium of said receiver side ROPA is pumped by means of receiver side pump power provided from said first location A. Note that due to the reverse order of signal transmission in the first and second transmission links, the first location resembles the "transmitter side" for the first transmission link, but the "receiver side" for the second transmission link. Similarly, the second location resembles the "receiver side" for the first transmission link, but the "transmitter side" for the second transmission link.

At least part of the receiver side pump power used for the receiver side ROPA in the second transmission link is power split off from the light passing said connection link from said second transmission link to said first transmission link and fed back into the second transmission link.

The invention makes use of the fact that fiber communication systems employ pairs of fibers that transmit signals in opposite directions. Moreover, measurement results reveal strong signal degradations of phase modulated signals making use of polarization multiplexing and coherent detection caused by copropagating pump signals. This has for example been demonstrated for CP-QPSK signals. According to the invention, in order to supply pump power to a ROPA located close to the transmitter side, at least a part of said transmitter side pump power is provided by means of light supplied from said first location A to said transmitter side ROPA via a portion of a second transmission link provided for transmitting optical signals from said second location B to said first location (A). As a consequence, the pump signals are propagating counterdirectionally to the signals transmitted in both of these transmission links. This way, the data signals will be affected much less than if the same pump power was provided codirectionally with the signal in the first transmission link from the first location to the transmitter side ROPA.

Moreover, according to the invention, said at least part of said transmitter side pump power is transferred from said second transmission link to said transmission link by means of a connection comprising a connection link which is connected at one end with the first transmission link and at the other and with the second transmission link by means of couplers. In said connection link, a splitter is provided which allows for splitting part of the light passing said connection link from said second transmission link to said first transmission link and feeding it back into the second transmission link, such that it can be used for pumping the receiver side ROPA provided in said second transmission link. This way, pump light used for both, the transmitter side ROPA in the first transmission link as well as pump light used for the receiver side ROPA provided in the second transmission link do not have to be separated in a wavelength-selective manner from each other. In fact, this method even allows to have the same wavelength pump power for both, the transmitter side ROPA in the first transmission link and the receiver side ROPA in the second transmission link.

This means in particular that the coupler that couples the connection link to the second transmission link does not have to be selective with regard to the wavelengths of the pump light for the transmission side ROPA in the first transmission link and the receiver side ROPA in the second transmission link. Instead, a broadband WDM coupler can be used which distinguishes between pump light and signal light wavelengths, but otherwise is transparent for all possible pump wavelengths. This is of tremendous advantage for many practical aspects. One specific example is that at this time of setting up the bidirectional optical link, no advance decisions have to be made regarding the actual pump wavelength used. This also allows changing the pump sources and the corresponding wavelengths during the operation lifetime of the bidirectional optical link.

This is also advantageous over an embodiment in which a simple splitter would be used in the second transmission link, splitting part of the pump light to be redirected to the first transmission link, while allowing part of the pump light to reach the receiver side ROPA in the second transmission link, because such a splitter would severely attenuate the data signal traveling on the second transmission link.

In principle, all of the pump power used by the transmitter side ROPA can be supplied this way, but the invention is not limited to this. However, in preferred embodiments, at least 30%, preferably at least 50%, and most preferably at least 70% of the transmitter side pump power is provided by means of said light supplied from said first location (A) to said transmitter side ROPA via a portion of a second transmission link.

In a preferred embodiment, said light providing said pump power for pumping the gain medium of said transmitter side ROPA is provided by one or more of
  a transmitter side pump signal for pumping said gain medium of said transmitter side ROPA,
  a pump signal for pumping a further amplifier, in particular a thulium doped fiber, in combination with a seed signal for generating a transmitter side pump signal for pumping said gain medium of said transmitter side ROPA and/or
  a shorter wavelength signal which upon one or more stimulated Raman scattering processes in combination with one or more seed signals produces a transmitter side pump signal for pumping said gain medium of said transmitter side ROPA, the wavelength of said shorter wavelength signal being shorter than the wavelength of said transmitter side pump signal.

In a preferred embodiment, additional pump power for pumping said gain medium of said transmitter side ROPA is supplied from the first location A to said transmitter side ROPA via said first transmission link, or in other words, in the "usual manner". As long as the amount of this additional power is not too high, its co-propagation with the data signals does not lead to an excessive distortion of the data signals carried in the first transmission link, in spite of the codirectional propagation. However, in order to keep the signal distortions low, the amount of said additional pump power supplied from the first location A to said transmitter side ROPA via said first transmission link is preferably chosen to be smaller than the amount of said transmitter side pump power provided by means of light via said portion of said second transmission link.

In a preferred embodiment, the transmitter side ROPA is located 20 to 70 km away from said first location A, preferably 30 to 60 km away therefrom.

In a preferred embodiment, said method further comprises amplifying said optical signal transmitted from said first location A to said second location B via said first transmission link by means of a receiver side ROPA provided in said first transmission link and comprising a gain medium, wherein said receiver side ROPA is pumped by means of pump power provided from said second location B. In other words, by combining, in said first transmission link, a transmitter side ROPA close to the first location and a receiver side ROPA close to the second location, an optimum amplification can be achieved.

Herein, the receiver side ROPA provided in said first transmission link is preferably located 60 to 150 km, more preferably 80 to 120 km away from said second location B. Alternatively or in addition, said receiver side ROPA and said transmitter side ROPA are located within said first transmission link at a distance of at least 10 km from each other.

In a preferred embodiment, said light providing said pump power for pumping the gain medium of said receiver side ROPA in said second transmission link is provided by one or more of
  a receiver side pump signal for pumping said gain medium of said receiver side ROPA,
  a pump signal for pumping a further amplifier, in particular a thulium doped fiber, in combination with a seed signal for generating a receiver side pump signal for pumping said gain medium of said receiver side ROPA and/or
  a shorter wavelength signal which upon one or more stimulated Raman scattering processes in combination with one or more seed signals produces a receiver side pump signal for pumping said gain medium of said receiver side ROPA, the wavelength of said shorter wavelength signal being shorter than the wavelength of said receiver side pump signal.

In a preferred embodiment, the optical signal transmitted from the second location B to the first location A via said second transmission link is further amplified by means of a transmitter side ROPA comprising a gain medium, wherein the gain medium of said transmitter side ROPA is pumped by means of transmitter side pump power provided from said second location B, and wherein at least a part of said transmitter side pump power is provided by means of light supplied from said second location B to said transmitter side ROPA via a portion of said first transmission link. In other words, the amplification with the transmitter side ROPA in said second transmission link is generally the same as described above with regard to the first transmission link, except that from the perspective of the second transmission link, the second location is the transmitter side.

According to a further aspect of the invention, a bidirectional optical link comprising first and second transmission links extending between a first location A and a second location B is provided. The first transmission link is for transmitting optical signals, in particular optical data signals from the first location A to the second location B, and said second transmission link is for transmitting optical signals, in particular optical data signals from the second location B to the first location A.

In said first transmission link, a transmitter side remote optically pumped amplifier (ROPA) comprising a gain medium is provided, wherein the gain medium of said transmitter side ROPA is configured to be pumped by means of transmitter side pump power provided from said first location A.

The transmitter side ROPA is arranged and configured such that at least a part of said transmitter side pump power can be provided by means of light supplied from said first location A to said transmitter side ROPA via a portion of said second transmission link.

According to a yet further aspect of the invention, a remote optically pumped amplifier (ROPA) comprising a gain medium is provided, which ROPA is for installation in a first transmission link for amplifying optical signals, in particular optical data signals transmitted therein. The ROPA further comprises a connection for transferring pump power from said second transmission link to said first transmission link.

According to a yet further aspect of the invention, a ROPA is provided which is formed in a double clad fiber, said double clad fiber having a core suitable for carrying data signals, an inner cladding having a first index of refraction and suitable for carrying pump signals, and an outer cladding having a second index of refraction. The double clad fiber has at least one first section, in which a boundary between the inner and outer claddings of the double clad fiber is at least nearly rotationally symmetric with respect to the axis of said double clad fiber, thereby promoting the formation of modes of light that have a comparatively little overlap with the core, and at least one second section, in which said boundary between the inner and outer claddings of the double clad fiber deviates from a rotationally symmetric structure and the propagation of said modes of light having little overlap with the core is impeded. A portion of the core of said double clad fiber located in and/or adjacent to the at least one second section comprises a gain medium, in particular an erbium doping.

Such a ROPA can be ideally used as a transmitter side ROPA, because pump light and signal light can be provided codirectionally, but at least approximately in different geometrical regions of the double clad fiber, such that the detrimental nonlinear effects encountered when pump light and signal light travels codirectionally in a same ordinary fiber can be kept low. Namely, since the boundary between the inner and outer claddings of the double clad fiber is at least nearly rotationally symmetric with respect to the axis of the double clad fiber, and typically circular, optical modes are formed that hardly overlap with the core of the double clad fiber. In the language of geometrical optics, these modes can be regarded as "helical rays" that do not pass the core. Accordingly, the overlap between the modes of the pump light and the modes of the data signal is very small, which keeps nonlinear interactions of the co-propagating light low and hence avoids the problems usually encountered when pump light and signal light are codirectionally propagating the same fiber core. Thus, the two lightwaves are propagating almost spatially separated from each other such as if they were propagating in different fibers.

Preferably, said first index of refraction is higher than said second index of refraction.

In a preferred embodiment, a plurality of first and second sections are alternatingly formed in said double clad fiber, wherein with each of said second sections, a corresponding portion of the core of said double clad fiber comprising said gain medium, in particular erbium doping, is associated. In this embodiment, effectively a plurality of ROPAs is formed in the double clad fiber along its length, allowing for keeping the power of the signal more constant along the fiber length than when a single ROPA is employed.

In a preferred embodiment, said double clad fiber has a first end, wherein at said first end, a transmitter is operatively connected with said double clad fiber such that data signals provided by said transmitter are coupled into the core, and wherein at said first end, a source of pump light is operatively connected with said double clad fiber such that pump light provided by said source of pump light is coupled into the inner cladding.

Preferably, at least a part of said at least one gain medium comprising portion of the core of said double clad fiber is located downstream from a corresponding second section with regard to data signals and pump light injected to the double clad fiber at said first end.

SHORT DESCRIPTION OF THE FIGURES

DESCRIPTION OF THE PREFERRED EMBODIMENTS

Figure 1:
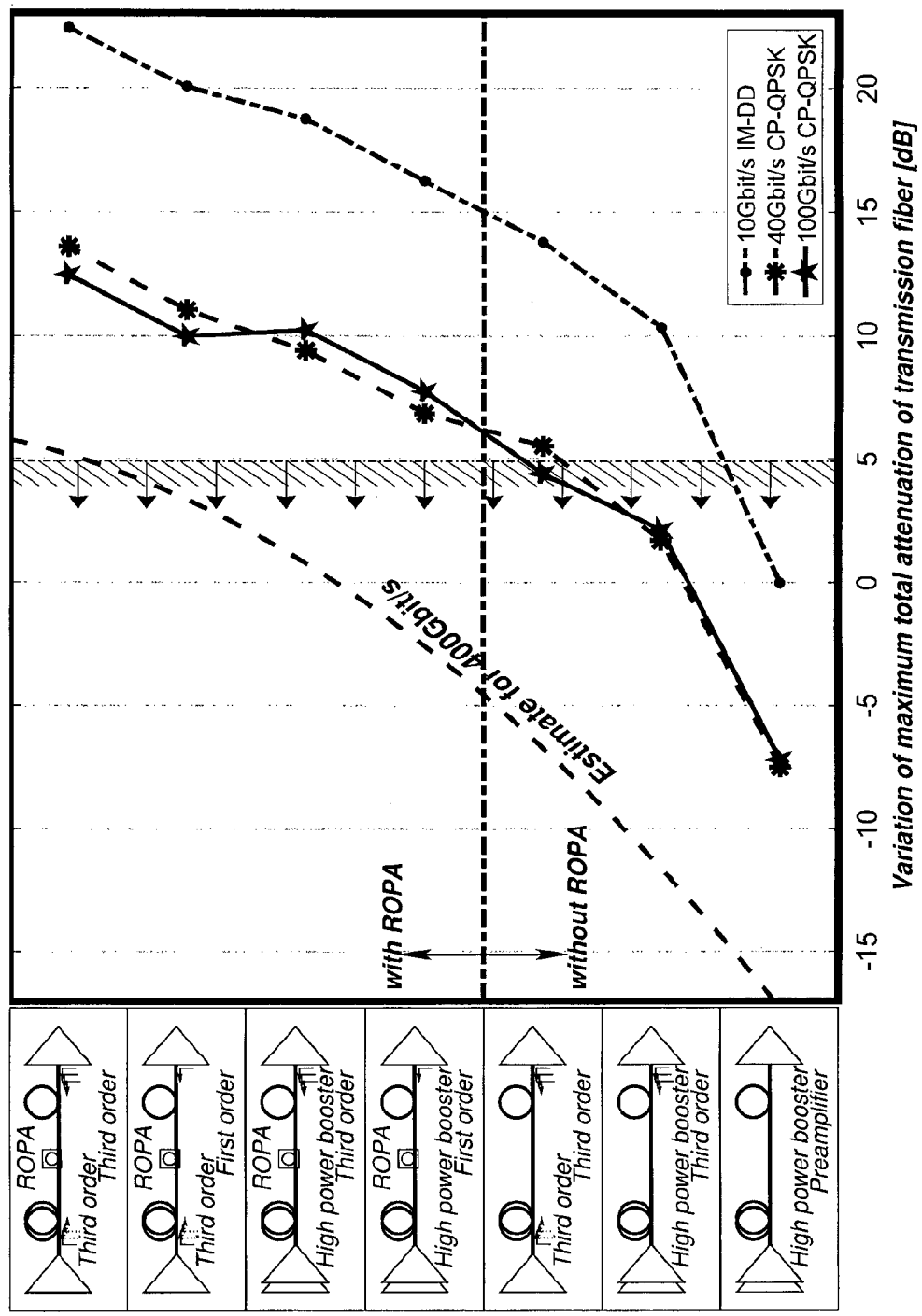
FIG. 1 is a diagram showing the reach improvement provided by different combinations of amplification technologies when using different modulation formats as compared with the base configuration operated with 10 Gbit/s.

For the purposes of promoting an understanding of the principles of the invention, reference will now be made to the preferred embodiments illustrated in the drawings and specific language will be used to describe the same. It will, nevertheless, be understood that no limitation of the scope of the invention is thereby intended, such alterations and further modifications in the illustrated device and such further applications of the principles of the invention as illustrated therein being contemplated as would normally occur now or in the future to one skilled in the art to which the invention relates.

Figure 4:
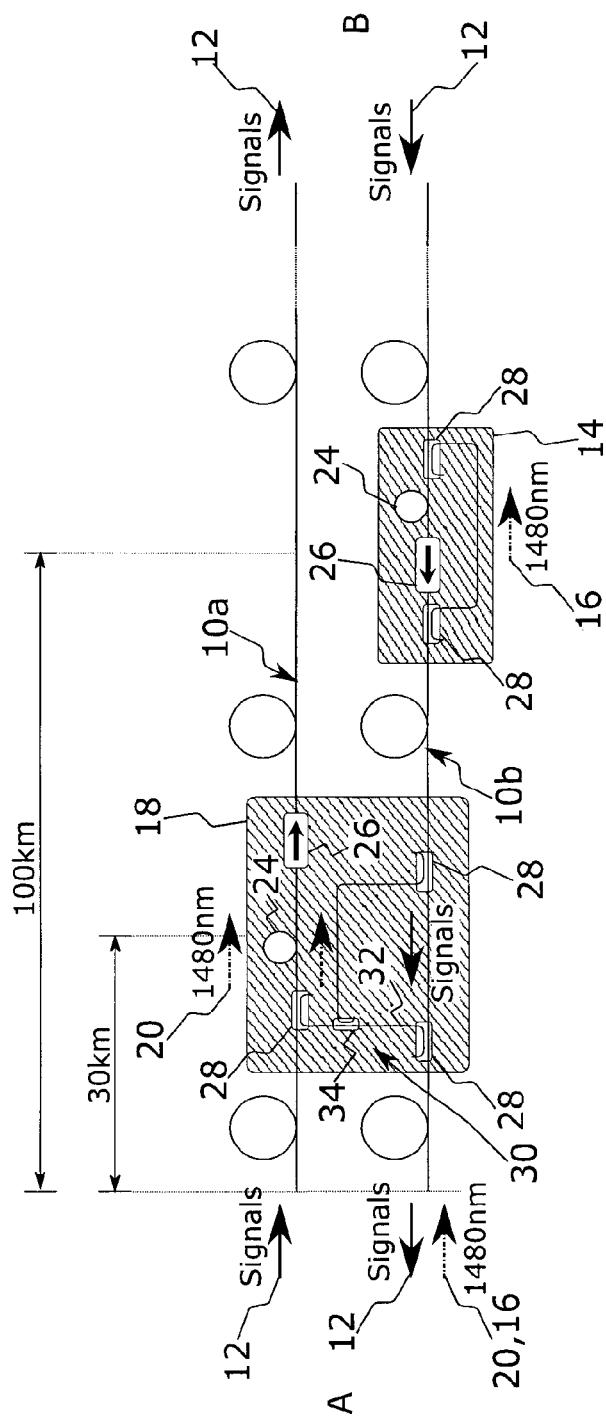
FIG. 4 shows an embodiment of the invention, in which pump power is supplied to the transmitter side ROPA via a fiber provided for data transmission in the opposite direction.

FIG. 4 shows an embodiment of the present invention. FIG. 4 shows a first transmission link 10a extending between first and second locations A and B, and a second transmission link 10b likewise extending between the first and second locations A and B for enabling data transmission in opposite direction. In this regard, the embodiment of the invention makes use of the fact that in fiber communication systems typically pairs of fibers (i.e. links 10a and 10b) are employed that transmit signals in opposite directions. In the embodiment shown in FIG. 4, the first link 10a is for transmitting data signals 12 from location A to location B, and the second link 10b is for transmitting data signals 12 from location B to location A. In the first link 10a, a transmitter side ROPA 18 is provided, which in the shown embodiment is located 30 km away from location A. In the second link 10b, a receiver side ROPA 14 is provided, which in the embodiment shown is 100 km away from location A, which for the second link 10b corresponds to the receiver side. While not shown in FIG. 4, which only shows the components close to location A, a similar transmitter side ROPA 18 would typically be provided in the second link 10b at approximately 30 km away from location B, and a similar receiver side ROPA 14 would be provided in the first link 10a approximately 100 km away from the second location B.

Figure 2:
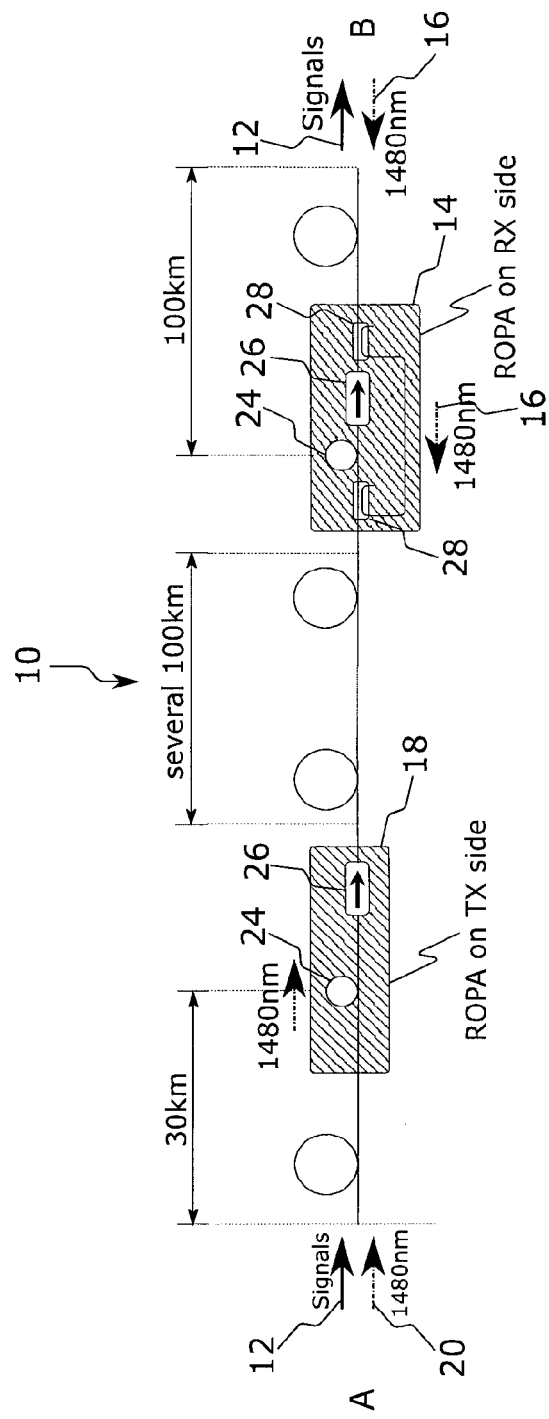
FIG. 2 shows a setup showing providing pump power to a receiver side ROPA and a transmitter side ROPA via the corresponding transmission fiber.
Figure 3:
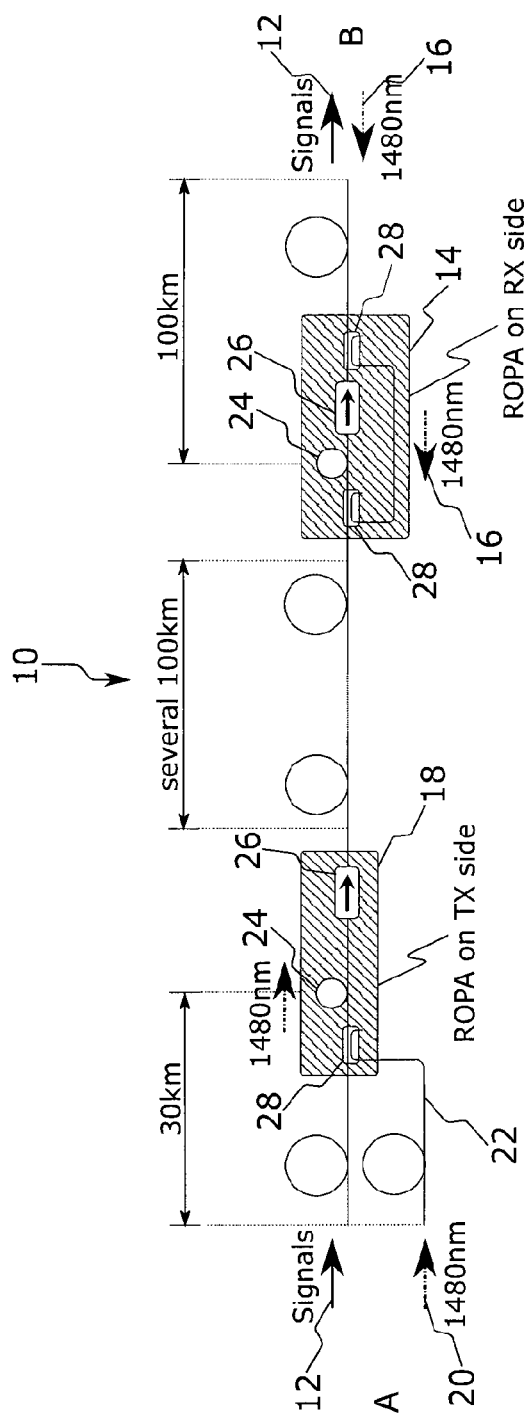
FIG. 3 shows an alternative setup, where pump power is fed to a transmitter side ROPA via a dedicated separate fiber.

As is further shown in FIG. 4, the transmitter side ROPA 18 comprises an erbium doped fiber (EDF) 24 and an isolator 26 in the same way as the ROPA 18 shown in FIGS. 2 and 3. However, the transmitter side ROPA 18 further comprises a connection 30 allowing transmitter side pump signals 20 to be fed from location A to the transmitter side ROPA 18 via the second transmission link 10b. In the embodiment shown, the connection 30 comprises two WDM couplers 28 connected by a connection link 32. The WDM couplers 28 are devised to pass the wavelength of the data signal 12 but to couple the wavelength of the pump signal 20 out of the second transmission link 10l) and into the first transmission link 10a. Within the connection link 32, a splitter 34 is provided which splits part of the pump signal 20 from the connection link 32 and feeds it back into the second transmission link 10b by means of a further WDM coupler 28. This split part of the pump signal 20 is then used to pump the receiver side ROPA 14 provided in the second transmission link 10b, and hence has the same function as the receiver side pump signal 16 shown in FIGS. 2 and 3.

FIG. 4 hence shows a solution for supplying the pump power (pump signal 20) for the transmitter side ROPA 18 via the second transmission link 10b used for data transmission in the opposite direction. Thus, the pump signal 20 is always travelling counterdirectionally to the data signals 12, and this way, signal distortions, such as phase distortions resulting from nonlinear fiber effects induced by the pump 20 signals are almost completely avoided. An appropriate location for coupling the pump signal 20 out of the second transmission link 10b and feeding it to the transmitter side ROPA 18 in the first transmission link 10a is at a distance between 30 km (as shown in the example) and 80 km. As shown in FIG. 4, an appropriate distance of the receiver side ROPA 14 in the second transmission link 10b is about 100 km away from location A, or in other words, from the receiver (not shown) to receive the data signals 12 carried on the second transmission link 10b.

Figure 5:
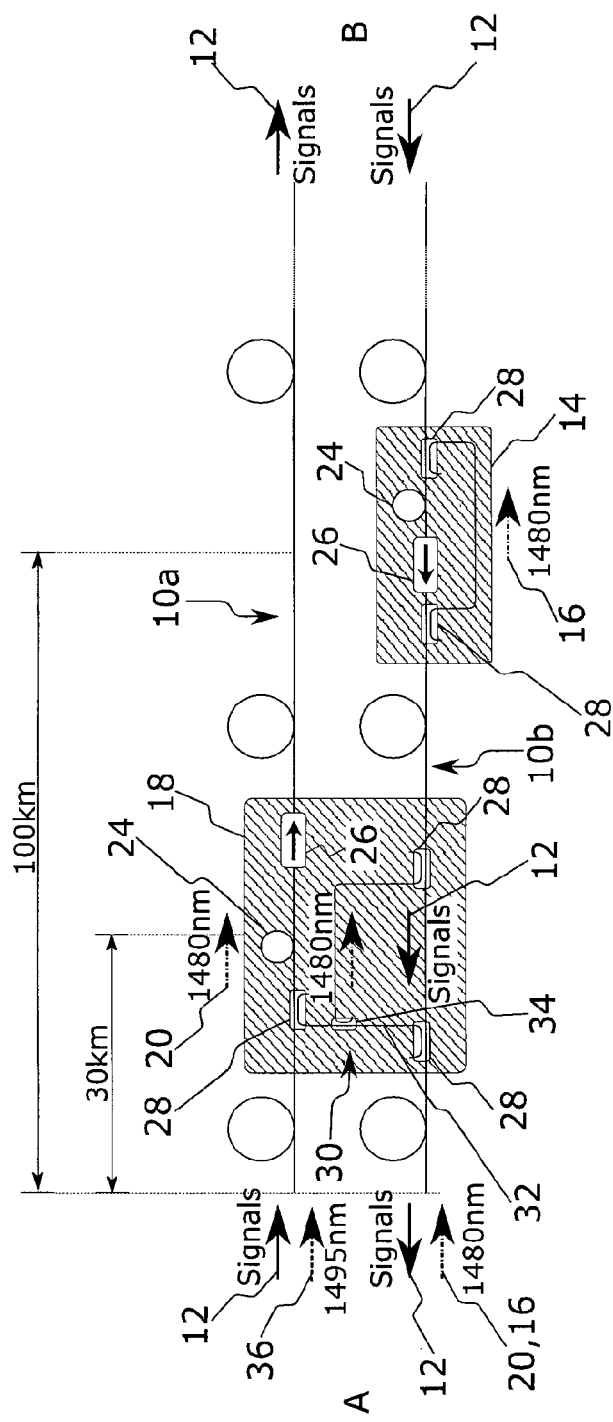
FIG. 5 shows a further embodiment similar to the setup of FIG. 4, in which additional pump power is supplied codirectionally with the data signals to the transmitter side ROPA.

Please note that the total pump power of the pump signal 20 that can be transmitted to the transmitter side ROPA 18 in this way is limited due to the Raman amplification induced thereby in the second transmission link 10b. However, it is possible to in addition transmit an additional pump signal 36 from location A to the transmitter side ROPA 18 via the first transmission link 10a codirectionally to the signals 12 provided that its power is small enough to avoid severe nonlinear distortions upon codirectional supply. This situation is shown in FIG. 5, where an additional pump signal with a wavelength of 1495 nm and moderate power is sent from location A to the transmitter side ROPA 18 via the first transmission link 10a. The wavelength of this additional pump signal 36 is chosen slightly different from the wavelength of the pump signal 20 (1480 nm) such as not to be affected by the WDM coupler 28 in the first transmission link 10a. The remainder of FIG. 5 is identical to FIG. 4.

Please note that all solutions presented so far are also compatible with higher-order pumping schemes. In fact, pump power can be transferred from a smallest wavelength to one or more intermediate low power seeds in the fiber segment from the receivers to the corresponding ROPA cassette. The wavelengths of the seeds are adapted to provide sufficient amplification in the EDF coils 24. Proper adjustment of the seed powers allows to optimize the ROPA gain of the receiver side ROPA 14 and the transmitter side ROPA 18 separately.

While the pump power launched into the ROPA cassette should be as high as possible, as indicated above, excessive Raman amplification of the signals 12 in the fiber section from the terminal where pump part light is injected (in the embodiment previously discussed, location A) to the ROPA cassette limits the maximum pump power. Using higher-order pumping, it is possible to provide the required pump power at smaller Raman gain. Thus, larger pump powers are acceptable.

Figure 6:
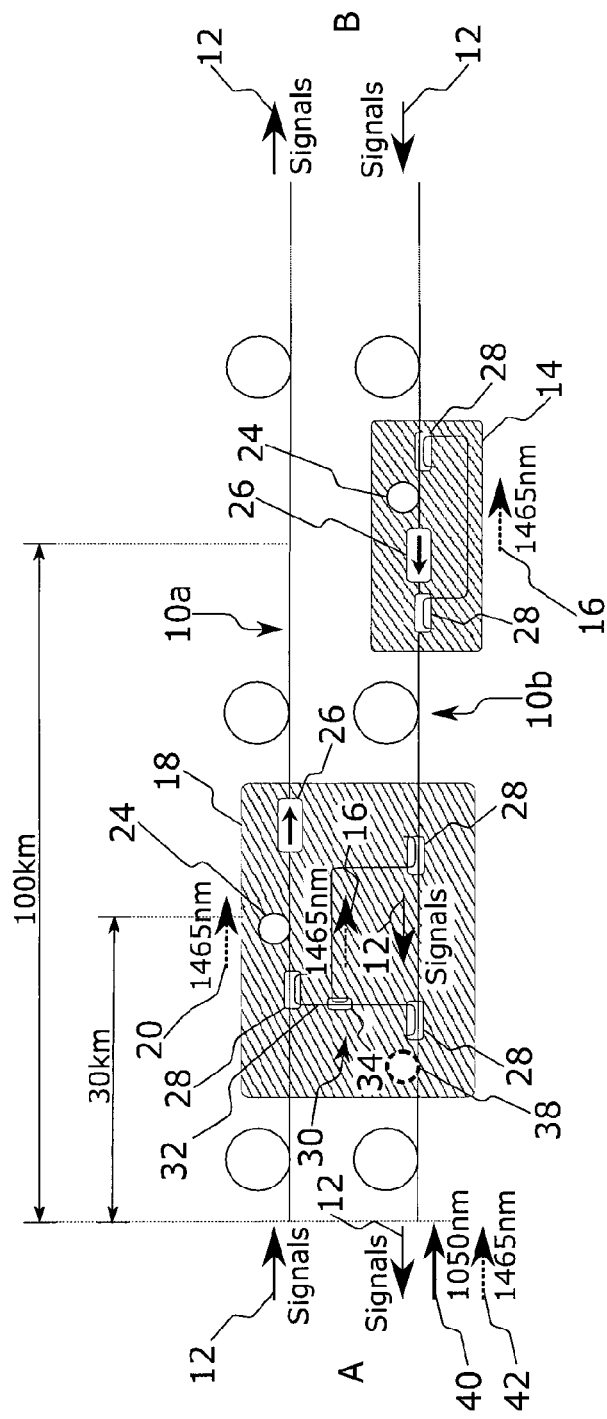
FIG. 6 shows a related embodiment employing a thulium doped fiber and a seed signal for generating a pump signal.

FIG. 6 shows a variant in which Raman amplification by the ROPA pump is avoided completely. The setup is generally the same as that of FIG. 4, except that a thulium-doped fiber (TDF) 38 is provided in the second transmission link 10b close to the connection 30 between the first and second transmission links 10a, 10b. In the shown embodiment, the TDF 38 is in fact arranged in the ROPA cassette of the transmitter side ROPA 14 just before the coupler 28. A TDF is suitable to provide amplification in the wavelength range from 1440 nm to 1480 nm and can be pumped at 1050 nm or 1064 nm. In the embodiment shown, the TDF 38 is pumped with a corresponding pump signal 40 at 1050 nm. Further, a seed signal 42 at 1465 nm is injected to the second transmission link 10b together with the pump signal 40 at location A. Due to the large wavelength separation, no power is transferred from the pump signal 40 to the seed signal 42 via stimulated Raman scattering. Furthermore, the data signals 12 carried in the second transmission link 10b do not experience phase fluctuations since the high power pump signal 40 is propagating counterdirectionally to the signals 12. In the first ROPA cassette of the transmitter side ROPA 14, the seed signal 42 is amplified in the TDF 38 before being provided to the two EDF coils 24 provided in the ROPAs 14, 18 for amplification of the signals 12 in the corresponding transmission links 10a, 10b. Please note that the TDF 38 is transparent for signals in the C-band (1530 nm to 1565 nm). However, in case there is some signal attenuation associated with signals 12 passing through the TDF coil 38, a corresponding bypass (not shown) could be used. Furthermore, instead of arranging the TDF 38 in the cassette of the transmitter side ROPA 18, it could also be placed in the fiber segment of the second transmission link 10b anywhere between location A and the connection 30.

Please note that instead of the thulium doped fiber any other medium that is suitable for amplifying wavelengths that may be used for pumping the gain medium 24 of the ROPA and that can be provided with energy by lightwaves that almost do not interact with the signals via SRS in the transmission fiber can be used.

Figure 7:
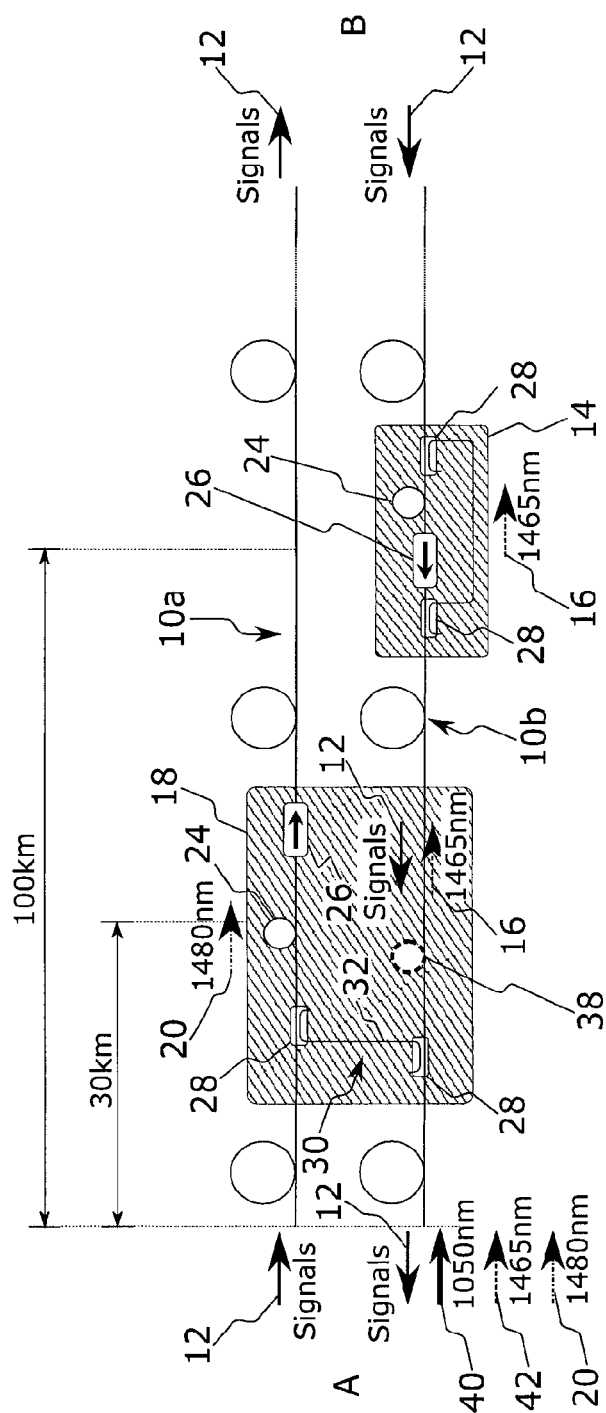
FIG. 7 shows a further related embodiment employing a thulium doped fiber and a seed signal for generating a pump signal.

FIG. 7 shows a modification of the setup of FIG. 6. A high power pump at 1480 nm (transmitter side pump signal 20) is launched into the second transmission link 10b for providing pump power to the transmitter side ROPA 18 in the same manner as explained with reference to FIG. 4. Furthermore, a low power seed signal 42 at 1465 nm and a high power pump signal 40 at 1050 nm (or 1064 nm) are launched into the second transmission link 10b. In the TDF 38, which in this embodiment is arranged to the right of the connection 30 (in other words, further away from location A than the connection 30), the low power seed 42 is amplified to a level that is sufficient for amplification in the receiver side ROPA 14 provided in the second transmission link 10b. Please note that the high power 1480 nm pump will slightly deplete the 1465 nm seed by stimulated Raman emission. However, this effect is quite weak due to the small wavelength separation.

The presented technique can be applied to any kind of waveguides transmitting signals in opposite directions. In the examples above, the waveguides have been identified with different single core fibers. However, the same technique could also be applied to pairs of cores of a multi-core fiber.

In all of the embodiments of FIGS. 4 to 7, the pump power for the transmitter side ROPA 18 in the first transmission link 10a, which would have to be transmitted codirectionally with the data signals 12 if provided within the transmission link 10a as well, is transmitted to the transmitter side ROPA 18 via the second transmission link 10b, where it is provided counterdirectionally to the data signals 12 carried in this second transmission link 10b. This way, a codirectional co-propagation of pump signal and data signal, and the signal distortion associated therewith, in particular the occurrence of severe phase noise, can be avoided.

Figure 8:
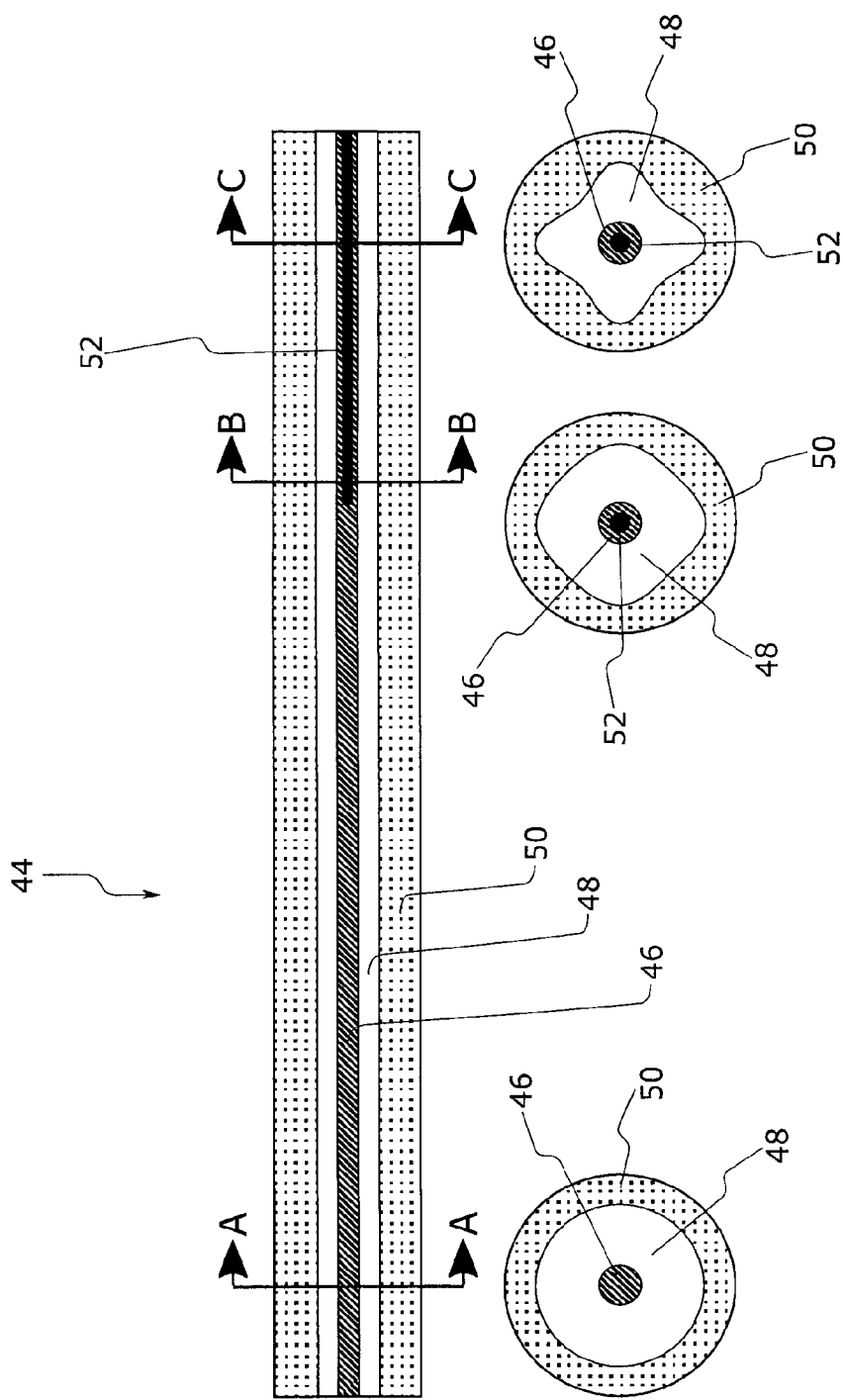
FIG. 8 shows a double clad fiber used for guiding pump power to the ROPA position.
Figure 10:
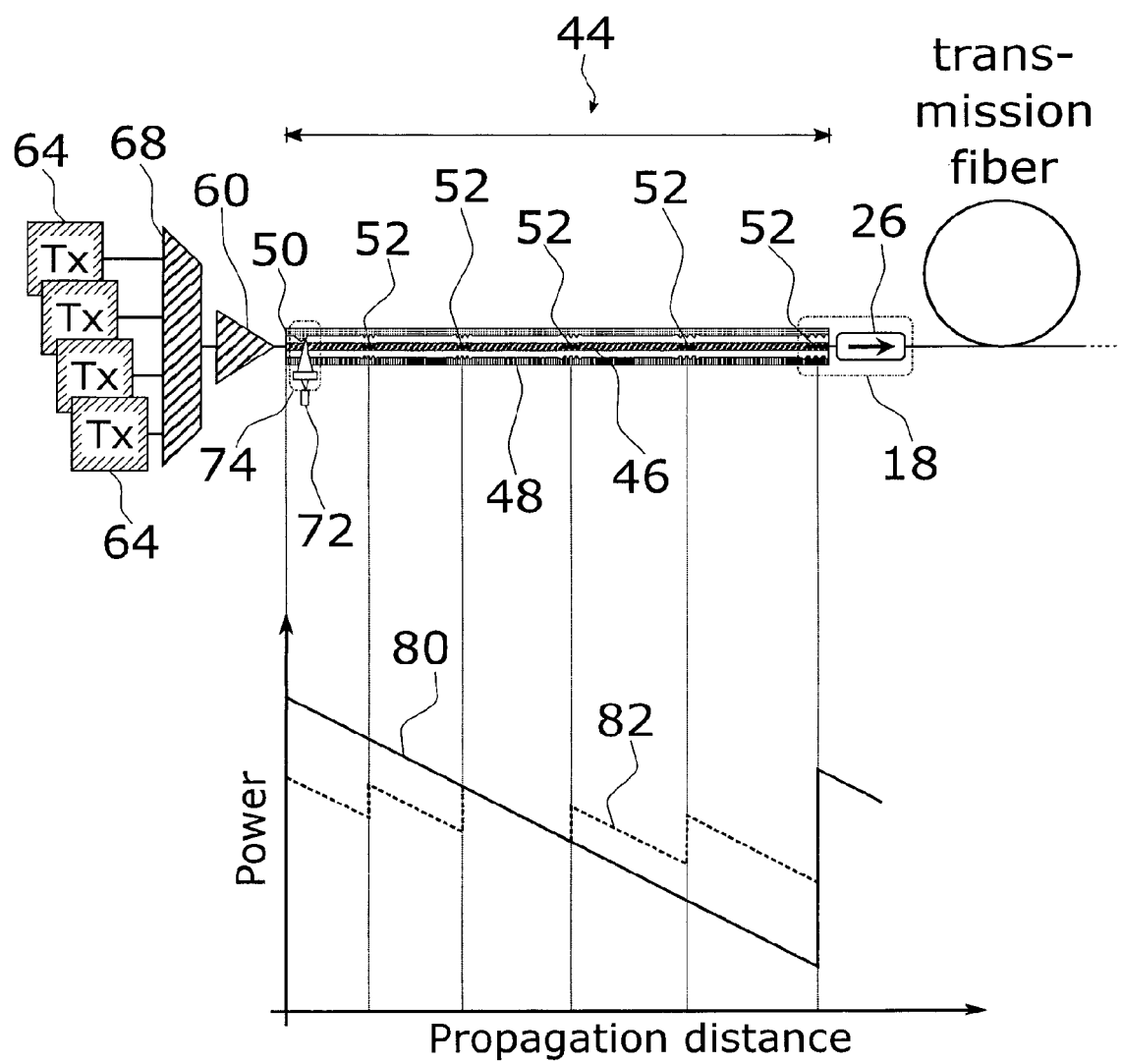
FIG. 10 shows a plurality of transmitter side ROPAs formed in a double clad fiber, as well as the corresponding power distribution.

FIG. 8 shows an alternative solution to the same problem of supplying pump power to the transmitter side ROPA 18 without inducing noticeable signal distortions due to nonlinear fiber effects. FIG. 10 shows a longitudinal section and three cross-sections of a double-clad fiber 44 that can be used for providing large pump powers to a part doped with erbium without inducing significant nonlinear effects. The double-clad fiber 44 has a core 46, and inner cladding 48 and an outer cladding 50. In the embodiment shown, the inner cladding 48 has a higher refractive index than the outer cladding 50. Thus, light can be guided within the inner cladding 48 in the same way as in the core 46, but at different wavelength.

The left end of the fiber 44 shown in FIG. 8 corresponds to the transmitter location. To the right of the section B-B in FIG. 10, the core 46 is doped with erbium as shown under reference sign 52, such that the right portion of the double clad fiber 44 effectively represents a transmitter side ROPA. In the illustration of FIG. 10, pump power 20 is coupled into the inner cladding 48 and propagates within this part of the fiber, while the data signals 12 propagate in the smaller core 46 like they are doing in standard fibers. In the left portion of the fiber 44, a symmetrical refraction index profile is chosen, as is apparent from section A-A. This symmetrical refraction profile is maintained for at least the main part of the distance where the erbium doping 52 starts, which distance could, by comparison with the embodiments previously described be on the order of 30 km for example.

The circular shape of the border separating the inner cladding 48 from the outer cladding 50 leads to many modes of the light that hardly overlap with the core 46. In the language of geometrical optics, these modes can be viewed as helical rays that do not pass the core 46. As a consequence, the overlap between the modes of the pump light 20 and the modes of the data signal 12, is very small, which keeps nonlinear interactions of the co-propagating light low and hence avoids the problems usually encountered when the pump light and the signal light are codirectionally propagating in the same fiber core.

Close to or at the location of the erbium doping 52 (or in other words, the ROPA) the shape of the outer cladding 48 is modified such as to be noncircular. At this part of the fiber 44, thanks to the "lower" symmetry, helical rays are suppressed and the overlap with the core is significantly increased. Thus, pump power of the pump signal 20 is directed into modes that have a high overlap with the doped core resulting in efficient pumping of the erbium ions in the core.

Figure 9:
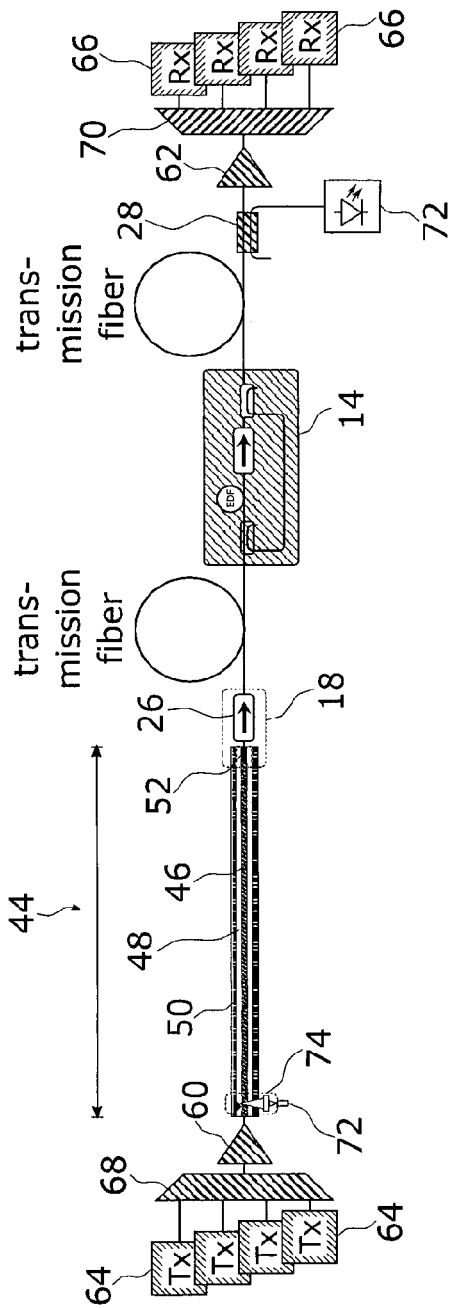
FIG. 9 shows a further embodiment of a transmitter side ROPA using a double clad fiber as shown in FIG. 8.

FIG. 9 shows how this double clad ROPA can be used as a transmission side ROPA in a transmission link. On the left of FIG. 9, a plurality of transmitters 64 are shown, which are connected to a multiplexer 68. A booster amplifier 60 is provided between the multiplexer 68 and the left end of the double clad fiber 44. Optical data signals are traveling in the double clad fiber 44, and more precisely in the core 46 of the double clad fiber 44, from left to right in FIG. 9. Further, a multimode light source 72 for providing pump light is coupled by means of a suitable coupling apparatus 74 with the inner cladding 48 of the double clad fiber 44 such as to travel codirectionally with the optical data signals from left to right, but at least predominantly in different geometrical regions of the double clad fiber 44.

Toward the right end of the double clad fiber 44, an erbium doped region 52 within the core 46 of the double clad fiber 44 is formed, which resembles a transmitter side ROPA 18 as disclosed herein. While not shown in detail in FIG. 9, close to or at the location of the erbium doping 52, the shape of the outer cladding 48 is modified such as to be noncircular, thereby causing an increased overlap of the pump light traveling within the inner cladding 48 with the erbium doped core 46 such as to pump the same and to cause an amplification of the data signals passing their through. The ROPA 18 further comprises an optical isolator 26. In addition, a receiver side ROPA 14 is provided, which is pumped counterdirectionally by pump light provided by a further multimode light source 72. At the right end of the transmission link, a preamplifier 62, a demultiplexer 70 and a number of receivers 66 are provided. The distance from the transmit side ROPA (after the isolator 26) to the receiver side is preferably bridged by single mode transmission fibers due to cost reasons.

In the presented example, the transmitters 64 are connected via the multiplexer 68 directly to the considered span. But of course, the optical signals might be provided to the span under consideration also via additional spans. Analogously, the signals transmitted over the considered span might be forwarded to the respective receivers via some additional fiber spans.

Instead of employing a single double clad fiber-based transmitter side ROPA 18, it is easily possible to provide for a plurality of transmitter side ROPAs 18, as is shown in FIG. 10. As is seen therein, the double clad fiber 44 in this case comprises five separate regions 52 with erbium doping, and a corresponding change in the shape of the outer cladding 48, each resembling effectively a transmitter side ROPA. Further shown in FIG. 10 is the power distribution of the optical signal as a function of propagation distance. The solid line shows the power distribution if only a single transmitter side ROPA was provided at the end of the double clad fiber 44. The dashed line shows the power distribution in case of the plural ROPAs, which can be kept nearly constant along the propagation distance.

The examples described above and the drawings merely serve to illustrate the invention and its advantages over the prior art, and should not be understood as a limitation in any sense. The scope of the invention is solely determined by the appended set of claims.

REFERENCE SIGNS

10 transmission link
12 data signal
14 receiver side ROPA
16 receiver side pump signal
18 transmitter side ROPA
20 transmitter side pump signal
22 separate fiber
24 EDF coil
26 optical isolator
28 WDM coupler
30 connection
32 connection link
34 splitter
36 additional pump signal
37 further connection
38 thulium doped fiber
40 pump signal for thulium doped fiber
42 seed signal
44 double clad fiber
46 core of double clad fiber 44
48 inner cladding of double clad fiber 44
50 outer cladding of double clad fiber 44
52 erbium doping within core of double clad fiber 44
60 booster amplifier
62 preamplifier
64 transmitter
66 receiver
68 multiplexer
70 demultiplexer
72 multimode light source
74 coupling apparatus
80 power distribution with one TX ROPA
82 power distribution with several TX ROPAs

The invention claimed is:

1. A method of amplifying optical data signal transmitted from a first location to a second location via a first transmission link,
    wherein said optical data signal is amplified using a transmitter side remote optically pumped amplifier (ROPA) comprising a gain medium,
    wherein said gain medium of said transmitter side ROPA is pumped using transmitter side pump power provided from said first location,
    wherein a first portion of said transmitter side pump power is provided using light supplied from said first location to said transmitter side ROPA via a portion of a second transmission link configured to transmit optical data signals to said first location,
    wherein at least a portion of said first portion of said transmitter side pump power is transferred from said second transmission link to said first transmission link using a connection link which is optically coupled, through a first WDM coupler, at a first end with said first transmission link and optically coupled, through a second WDM coupler, at a second end with said second transmission link,
    wherein said connection link further comprises a splitter configured to split off a portion of light passing along said connection link and feeding said split portion of said light back into said second transmission link,
    wherein said method further comprises a step of amplifying an optical data signal transmitted to said first location via said second transmission link,
    wherein said step of amplifying said optical data signal comprises amplifying said optical data signal using a receiver side ROPA provided in said second transmission link,
    wherein said receiver side ROPA comprises a gain medium,
    wherein said gain medium of said receiver side ROPA is pumped using receiver side pump power provided from said first location,
    wherein at least a portion of said receiver side pump power is provided using said split portion of said light,
    wherein a second portion of said transmitter side pump power to pump said gain medium of said transmitter side ROPA uses light supplied from said first location to said transmitter side ROPA via said first transmission link to the exclusion of the second transmission link,
    wherein said second portion of said transmitter side pump power is smaller than said first portion of said transmitter side pump power.

2. The method of claim 1, wherein at least 30% of said transmitter side pump power is said second portion of said transmitter side pump power.

3. The method of claim 1, wherein said transmitter side pump power is provided at least in part by at least one of;
    a pump signal configured to pump an additional amplifier, in combination with a seed signal to generate a transmitter side pump signal to pump said gain medium of said transmitter side ROPA, wherein said additional amplifier is a thulium doped fiber amplifier,
    a shorter wavelength signal which upon at least one stimulated Raman scattering process in combination with one or more seed signals produces a transmitter side pump signal to pump said gain medium of said transmitter side ROPA, said wavelength of said shorter wavelength signal being shorter than said wavelength of said transmitter side pump signal.

4. The method of claim 1, wherein said transmitter side ROPA is located within a range of 20 to 70 km away from said first location.

5. The method of claim 1, wherein:
said method further comprises amplifying said optical signal transmitted from said first location to said second location via said first transmission link using a receiver side ROPA provided in said first transmission link and comprising a gain medium, wherein said receiver side ROPA provided in said first transmission link is pumped using pump power provided from said second location;
said receiver side ROPA provided in said first transmission link is located within a range of 60 to 150 km from said second location;
said receiver side ROPA provided in said first transmission link and said transmitter side ROPA are located within said first transmission link at a distance of at least 10 km from each other.

6. The method of claim 1, wherein said light providing said pump power to pump said gain medium of said receiver side ROPA in said second transmission link is provided at least in part by at least one of:
a pump signal configured to pump an additional amplifier, in combination with a seed signal to generate a receiver side pump signal to pump said gain medium of said receiver side ROPA, wherein said additional amplifier is a thulium doped fiber amplifier,
a shorter wavelength signal which upon at least one stimulated Raman scattering process in combination with one or more seed signals produces a receiver side pump signal to pump said gain medium of said receiver side ROPA, said wavelength of said shorter wavelength signal being shorter than said wavelength of said receiver side pump signal.

7. The method of claim 1, wherein:
said optical signal transmitted to said first location via said second transmission link is further amplified using a transmitter side ROPA provided in said second transmission link comprising a gain medium;
said gain medium of said transmitter side ROPA provided in said second transmission link is pumped using transmitter side pump power provided from another location that does not comprise the first location; and
at least a part of said transmitter side pump power is provided using light supplied from said another location to said transmitter side ROPA provided in said second transmission link via a portion of said first transmission link.

8. A bidirectional optical link comprising first and second transmission links extending between a first location and a second location, said first transmission link configured to transmit optical data signals from said first location to said second location, and said second transmission link configured to transmit optical data signals from said second location to said first location,
wherein said first transmission link comprises a transmitter side remote optically pumped amplifier (ROPA) of said first transmission link comprising a gain medium,
wherein said gain medium of said transmitter side ROPA of said first transmission link is configured to be pumped by transmitter side pump power provided from said first location,
wherein a first portion of said transmitter side pump power uses light supplied from said first location to said transmitter side ROPA of said first transmission link via a portion of said second transmission link,
further comprising a connection link configured to transfer said light supplied from said first location to said transmitter side ROPA of said first transmission link via said portion of said second transmission link,
wherein said a connection link is optically coupled, through a first WDM coupler, at a first end with said first transmission link and optically coupled, through a second WDM coupler, at a second end with said second transmission link,
wherein said connection link further comprises a splitter configured to split off a portion of light passing along said connection link and feeding said split portion of said light back into said second transmission link,
wherein said bidirectional optical link further comprises a receiver side ROPA provided in said second transmission link,
wherein said receiver side ROPA comprises a gain medium,
wherein said gain medium of said receiver side ROPA is configured to be pumped using receiver side pump power provided from said first location,
wherein at least part of said receiver side pump power is supplied by said split portion of said light,
wherein said bidirectional optical link is further configured to provide a second portion of said transmitter side pump power to pump said gain medium of said transmitter side ROPA of said first transmission link using light supplied from said first location to said transmitter side ROPA of said first transmission link via said first transmission link to the exclusion of the second transmission link,
wherein said second portion of said transmitter side pump power is smaller than said first portion of said transmitter side pump power.

9. The bidirectional optical link of claim 8, further configured such that at least 30% of said transmitter side pump power is said second portion of said transmitter side pump power.

10. The bidirectional optical link of claim 8, wherein said transmitter side pump power is provided at least in part by at least one of:
a light source configured to provide a pump signal to pump an additional amplifier, in combination with a seed signal to generate a transmitter side pump signal to pump said gain medium of said transmitter side ROPA of said first transmission link, wherein said additional amplifier is a thulium doped fiber amplifier,
a light source configured to provide a shorter wavelength signal which upon one or more stimulated Raman scattering processes in combination with one or more seed signals produces a transmitter side pump signal to pump said gain medium of said transmitter side ROPA of said first transmission link, said wavelength of said shorter wavelength signal being shorter than said wavelength of said transmitter side pump signal.

11. The bidirectional optical link of claim 8, wherein said transmitter side ROPA of said first transmission link is located within a range of 20 to 70 km away from said first location.

12. The bidirectional optical link of claim 8, further comprising a receiver side ROPA provided in said first transmission link and comprising a gain medium, wherein said receiver side ROPA is configured to be pumped using pump power provided from said second location.

13. The bidirectional optical link of claim 12, wherein said receiver side ROPA provided in said first transmission link is located within a range of 60 to 150 km away from said second location.

14. The bidirectional optical link of claim 12, wherein said receiver side ROPA and said transmitter side ROPA of said first transmission link are located within said first transmission link at a distance of at least 10 km from each other.

15. The bidirectional optical link of claim 8, wherein said split portion of said light is provided at least in part by at least one of:
- a light source configured to provide a pump signal to pump an additional amplifier, in combination with a seed signal to generate a receiver side pump signal to pump said gain medium of said receiver side ROPA, wherein said additional amplifier is a thulium doped fiber amplifier,
- a light source configured to provide a shorter wavelength signal which upon one or more stimulated Raman scattering processes in combination with one or more seed signals produces a receiver side pump signal to pump said gain medium of said receiver side ROPA, said wavelength of said shorter wavelength signal being shorter than said wavelength of said receiver side pump signal.

16. The bidirectional optical link of claim 8, wherein said second transmission link further comprises a transmitter side ROPA comprising a gain medium configured to be pumped using transmitter side pump power provided from said second location, wherein at least a part of said transmitter side pump power provided from said second location is provided using light supplied from said second location to said transmitter side ROPA of said second transmission link via a portion of said first transmission link.

17. A remote optically pumped amplifier (ROPA) comprising a gain medium, said ROPA configured to be installed in a first transmission link and to amplify optical data signals transmitted therein,
- wherein said ROPA further comprises a connection link for transferring pump power from a second transmission link to said first transmission link,
- wherein said connection link is optically coupled, through a first WDM coupler, at a first end with said first transmission link and optically coupled, through a second WDM coupler, at a second end with a second transmission link, and
- wherein said connection link further comprises a splitter configured to split off a portion of light passing along said connection link and feeding said split portion of said light back into said second transmission link.

18. The ROPA of claim 17, wherein said pump power transferred by said connection link is a first portion of pump power that the first ROPA is configured to use to amplify optical data signals,
- wherein a second portion of pump power that that the first ROPA is configured to use to amplify optical data signals is communicated to the first ROPA along an optical path that does not comprise said connection link,
- wherein said second portion of said pump power is smaller than said first portion of said transmitter side pump power.

* * * * *